United States Patent
Gilbert

(10) Patent No.: US 7,062,042 B1
(45) Date of Patent: Jun. 13, 2006

(54) COMBINATION EXTERIOR TELEPHONE SERVICE TERMINAL AND SPLICING CHAMBER

(75) Inventor: Jeffrey Gilbert, Miami, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 689 days.

(21) Appl. No.: 10/299,850

(22) Filed: Nov. 20, 2002

(51) Int. Cl.
*H01R 9/24* (2006.01)
*H01R 11/09* (2006.01)
*H04M 9/00* (2006.01)

(52) U.S. Cl. .......................... 379/413.02; 379/413.04; 439/709; 439/723

(58) Field of Classification Search ................ 220/4.02; 379/399.01, 412, 413.02, 413.03, 413.04; 439/709, 723
See application file for complete search history.

(56) References Cited

U.S. PATENT DOCUMENTS

| | | | |
|---|---|---|---|
| 4,945,560 A | 7/1990 | Collins et al. | 379/413.02 |
| 5,235,638 A | 8/1993 | Dondero | 379/413.04 |
| 5,803,292 A | 9/1998 | Daoud | 220/4.02 |
| 5,978,472 A | 11/1999 | Tuvy et al. | 379/413.02 |
| 6,282,285 B1 | 8/2001 | Daoud | 379/399.01 |

*Primary Examiner*—Harry S. Hong
(74) *Attorney, Agent, or Firm*—Merchant & Gould

(57) ABSTRACT

The present invention is directed to an exterior telephone service interface for exterior mounting at a customer's premises. The telephone service interface combines both a terminal chamber for delivery of telephone service to the customer and a splicing chamber for connection to the incoming telephone service lines into a single wall mountable unite. The combination terminal chamber and splicing chamber can accommodate a plurality of splices and terminal interfaces and reduces installation time significantly.

7 Claims, 2 Drawing Sheets

COMBINATION EXTERIOR TELEPHONE SERVICE TERMINAL AND SPLICING CHAMBER

FIELD OF THE INVENTION

The present invention relates to telephone service line terminals.

BACKGROUND

In order to provide telephone services to subscribers from a Service Provider Network (SPN), the incoming telephone line from the SPN is connected to the customer's premises, specifically, the line is typically connected to a terminal or interface box at the customer's premises. That box is then wired into the customer's premises. The incoming service line for the SPN contains a number of individual copper phone lines that need to be electrically coupled to an equal number of terminals inside the terminal or interface box. In order to provide for this coupling, the terminal box includes a wire tail extending from the box. The wire tail includes a bundle of wire leads that are hardwired to the plurality of terminals inside the box.

In order to couple the incoming SPN telephone line and the terminal box, the individual copper phones lines are physically spliced to the bundle of wire leads within the wire tail. This requires stripping each copper phone line and each wire lead, and making one splice per mated pair. In addition, since the connection between the SPN and the customer is located on the exterior of a building, the splices must be protected from the weather and elevated above the ground. This requires a separate splicing cover to provide an enclosure for the splices. A mounting bracket must also be supplied to mount the splicing cover on the wall. Therefore, delivery of phone service to the customer requires various equipment and a significant amount of installation time, increasing the cost of each installation and limiting the number of installations that any one technician can accomplish on a given day.

A system for delivering phone service to a customer is desired that decreases the amount of equipment required and shortens the installation time. Suitable systems would still be usable for use in exterior locations and would work with existing telephone supply lines and customer premises.

SUMMARY OF THE INVENTION

The present invention is directed to a combination telephone service terminal and splicing chamber for use at a subscriber's premises, for example a business services subscriber, to provide an interface between the telephone network and the subscriber. One embodiment of the combination terminal and splicing chamber is arranged to be mounted on a vertical wall at the subscriber's premises in an exterior location exposed to various weather conditions.

One embodiment of the present invention is a combination terminal and splicing chamber that includes a terminal chamber capable of being sealed for use in exterior applications, a separate splicing chamber in contact with the terminal chamber and also capable of being sealed for use in exterior applications, and a plurality of connection terminals. Each connection terminal includes a first connector to provide a connection to a subscriber and a second connector that is electrically coupled to the first connector to provide a connection for one of a plurality of supply leads in the telephone supply line. The splicing chamber includes at least one opening for receiving the telephone supply line. In addition, the splicing chamber can be accessed and sealed independent of the terminal chamber and includes a lock to prevent unauthorized access to the splicing chamber.

The combination telephone terminal and splicing chamber of the present invention provides the advantage of quicker and less costly installation at the subscriber's premises. Quicker installation reduces cost associated with installation as less technician time is required per installation. In addition, since both the telephone interface terminals and the splicing chamber for connection to the telephone supply line are provided in a single device, additional components such as separate splicing chambers are eliminated, eliminating the cost and installation time associated with these additional components.

DETAILED DESCRIPTION

Figure 1:
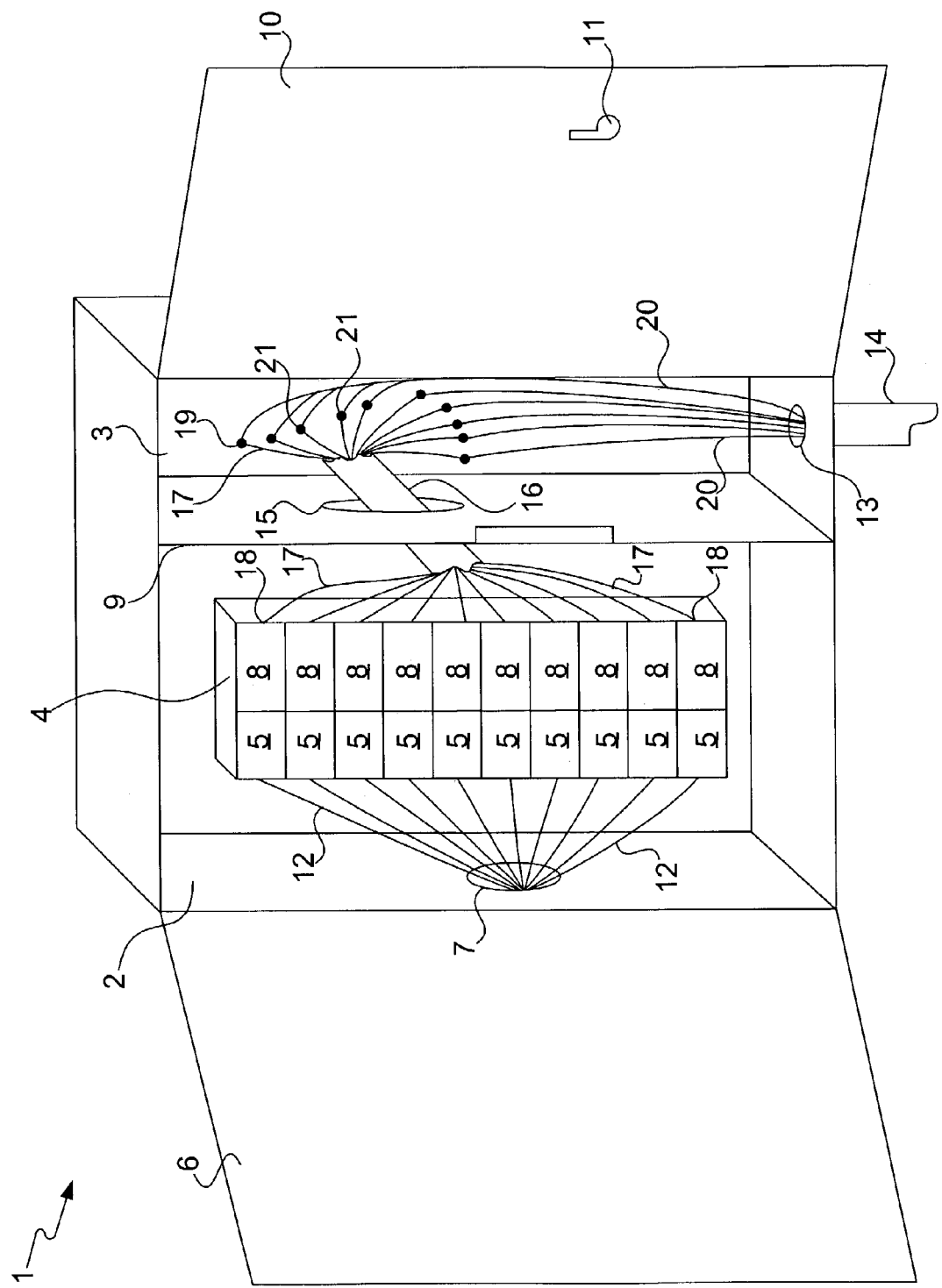
FIG. 1 is a perspective view of one embodiment of the combination terminal chamber and splicing chamber of the present invention with both chambers open.

Referring initially to FIG. 1, an embodiment of the combination telephone service terminal and splicing chamber 1 according to the present invention is illustrated. The combination telephone service terminal and splicing chamber is suitable for use in exterior applications that are exposed to a variety of weather conditions. Included in the terminal and splicing chamber combination are two chambers, a terminal chamber 2 and a splicing chamber 3. The terminal chamber 2 provides an interface connection between the customer's premise and the telephone service provided, for example, by the Service Provider Network ("SPN"). The splicing chamber provides an enclosed weather-tight location to make the connection between the incoming telephone service line from the SPN and the interface connection located in the terminal chamber 2. Suitable materials for the combination telephone service terminal and splicing chamber 1 include metals and plastics. Preferably, the combination terminal chamber and splicing chamber is arranged to be directly mounted to a vertical surface, for example an exterior wall, at the customer's premises.

The terminal chamber is capable of being adequately sealed to provide protection from the elements and includes a terminal chamber door 6 that is hingedly connected to the terminal chamber. Gasketing may also be provided around the terminal chamber door 6 to provide for additional sealing. In one embodiment, the terminal chamber 2 includes a plurality of connection terminals 4. Each connection terminal 4 contains a first connector 5 to provide a plurality of telephone service connections for wiring 12 leading into the customer or subscriber's premises or connecting to customer premises equipment. Any type of conventional wire terminal can be used as the first connector including screw type and spring loaded connectors. Access into the terminal chamber 2 for the wiring leading into the subscriber's premises is provided by at least one terminal chamber opening 7. This terminal chamber opening 7 may include gasketing or similar arrangements to maintain the weather-tight seal of the terminal chamber 7.

In this embodiment, the connection terminals 4 also include a plurality of second connectors 8 that are electrically coupled to the first connectors 5. Any type of conventional wire terminal can be used as the second connector including screw type and spring loaded connectors. The second connectors 8 provide a connection for the incoming telephone service from the SPN.

The splicing chamber 3 is in contact with the terminal chamber 2 but is separated from the splicing chamber by at least one divider 9. The splicing chamber is also suitable for use in exterior locations and can be adequately sealed from environmental conditions. The splicing chamber can be accessed and sealed independent of the terminal chamber. Therefore, the splicing chamber includes a separate splicing chamber door 10 hingedly attached to the splicing chamber. Gasketing may also be provided around the splicing chamber door 10 to provide for additional sealing. At least one lock 11 can be included on the splicing chamber door to prevent unauthorized access to the splicing chamber. A similar lock can be included on the terminal chamber door.

The splicing chamber 3 provides a protected area for making the necessary electrical connections between the connection terminals and the incoming telephone service lines from the SPN. Access to the splicing chamber for the incoming telephone service lines is provided by at least one splicing chamber opening 13 arranged to accept an incoming telephone service line 14 or an electrical conduit (not shown) containing the incoming telephone supply line.

To provide for electrical coupling between the connection terminals 4 and the incoming service line 14 within the splicing chamber 3, the divider 9 includes at least one passage 15. The passage can include gasketing to provide a weather-tight seal between the two chambers. Extending through the passage is at least one wiring tail 16 that includes a plurality of wires 17 having lengths sufficient to provide an electrically bridge between the terminal chamber and the splicing chamber. Each one of these wires 17 includes a first end 18 that is electrically coupled to one of the second connectors 8 and a second end 19 opposite the first end 18. The second ends are preferably disposed in the splicing chamber. The first ends can be releasably attached to the second connector using, for example, screw-type or spring loaded terminals. Alternatively, the first ends can be fixed to the second connectors using methods such as soldiering. In another embodiment, the first ends are connected directly to first connectors through any suitable method known and available in the art, obviating the need for the second connectors.

The incoming telephone supply line 14 includes a plurality of copper telephone lines 20. Each copper telephone line is spliced to one of the second ends using a plurality of splices 21. Suitable splicing methods are known and available in the art and include using wiring nuts or crimp-type connectors. Alternatively, the splicing chamber can include a plurality of splicing connectors similar to the plurality of connection terminals in the terminal chamber. In this alternative embodiment, the splicing chamber connector would include a plurality of first contacts electrically coupled to the second ends of the wiring tail and a plurality of second contacts electrically coupled to the first contact to provide a connection for the plurality of copper telephone leads in the telephone supply line. In one embodiment, the terminal chamber includes from about 25 up to about 100 connection terminals. In addition, the splicing chamber can accommodate the required number of splices, for example, from about 25 up to about 100 splices. The second ends 19, the first connectors 5, and the second connectors 8 can also include corresponding lettering or numbering (not shown) to facilitate wiring.

Figure 2:
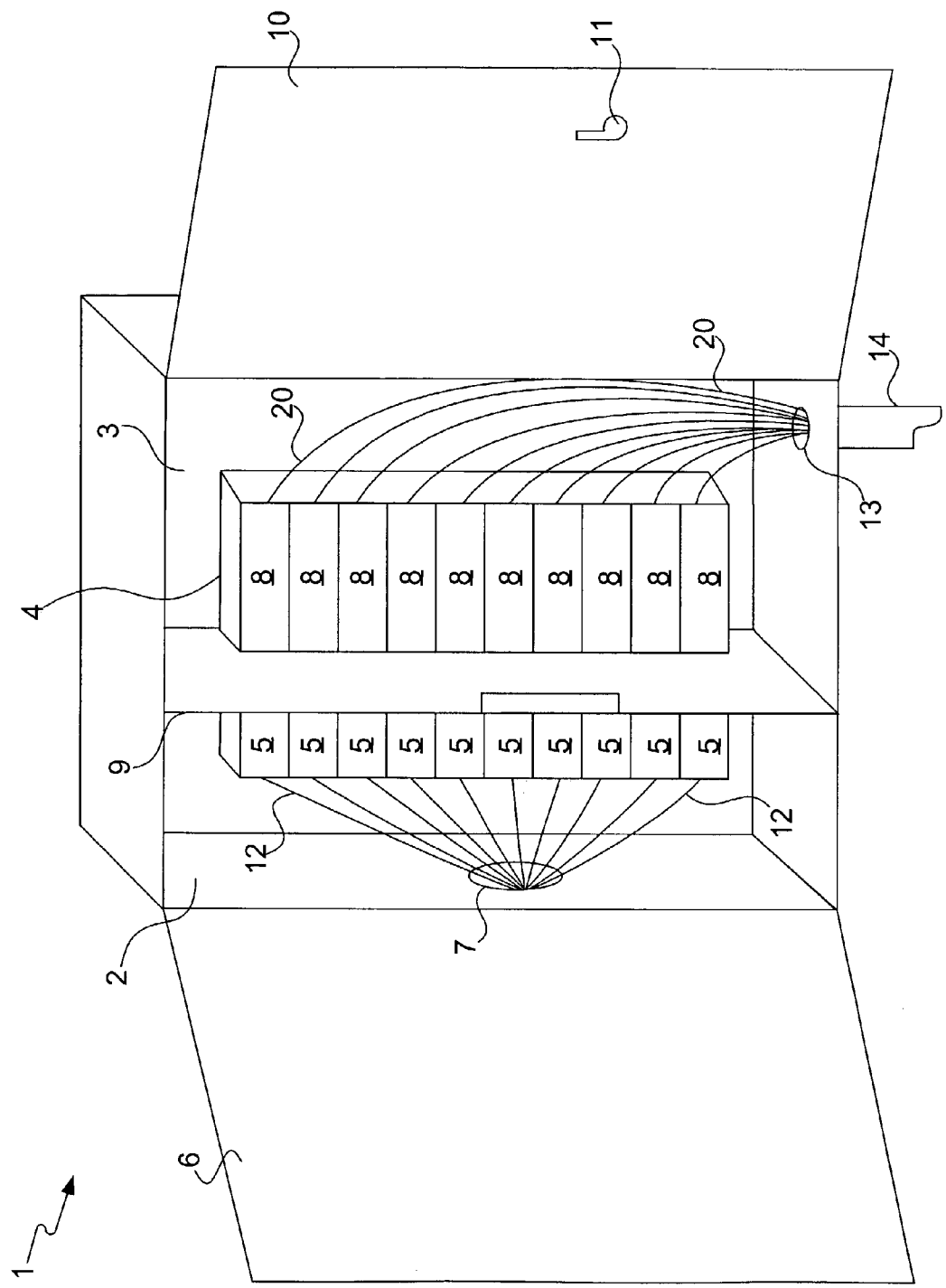
FIG. 2 is a perspective view of another embodiment thereof.

In another embodiment of a combination telephone service terminal and splicing chamber 1 according to the present invention as shown in FIG. 2, the connection terminals are positioned such that the first connectors 5 are disposed in the terminal chamber 2 and the second connectors 8 are disposed in the splicing chamber 3. Since, the first connectors and second connectors are electrically coupled, the wiring tail is not needed. The divider 9 runs down the middle of the plurality of connection terminals to provide the physical division between the chambers, and in one embodiment, is incorporated into the connection terminals. In this embodiment, the copper telephone leads 20 from the telephone supply line are directly coupled to the second connectors 8. In this embodiment, connecting the copper leads 20 to the second connectors simply involves stripping a short portion of each copper lead and inserting it into the second connector and securing it by, for example, turning a screw or releasing a spring, providing quick and easy wiring and delivery of telephone service to the customers premises.

Using the combination telephone service terminal and splicing chamber of the present invention reduces the number of physical connections having that need to be made and reduces the pieces of equipment required to one. This decrease cost and the technician time associated with an installation. For example, the time associated with an installation is reduced from one hour down to fifteen minutes. In addition, the types of connections required can be simplified so that to minimize the labor involved in making the physical connections.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A combination telephone service terminal and splicing chamber for use in exterior applications exposed to the environment, the combination terminal and splicing chamber comprising:
    a partition disposed in the combination chamber and dividing the combination chamber into a terminal chamber capable of being sealed for use in exterior applications, and a splicing chamber in contact with but separate from the terminal chamber and capable of being sealed for use in exterior applications, the splicing chamber having a housing with at least one opening for receiving a telephone supply line; and
    a plurality of connection terminals, each connection terminal comprising:
        a first connector disposed on one side of the partition so as to be in the terminal chamber to provide a plurality of telephone service connections to a subscriber and
        a second connector disposed on the other side of the partition so as to be in the splicing chamber and electrically coupled to the first connector to provide a connection to the first connector for one of a plurality of supply leads in the supply line
    so that a telephone service connection made to a second connector in the splicing chamber is thereby electrically connected to a corresponding first connector in the terminal chamber.

2. The combination terminal and splicing chamber of claim 1, further comprising from about 25 to about 100 connection terminals.

3. The combination terminal and splicing chamber of claim 1, wherein the splicing chamber can be accessed and sealed independent of the terminal chamber.

4. The combination terminal and splicing chamber of claim 1, wherein the splicing chamber further comprises a lock to prevent unauthorized access to the splicing chamber.

5. The combination terminal and splicing chamber of claim 1, wherein the combination terminal and splicing chamber is arranged to be directly mounted on a vertical surface.

6. The combination terminal and splicing chamber of claim 1, wherein the partition extends along an intermediate point of the plural connection terminals to provide physical division between the terminal chamber and the splicing chamber, with the first connector of each connection terminal being on the one side of the partition and the second connector of each connection terminal being on the other side of the partition.

7. The combination terminal and splicing chamber of claim 6, wherein the partition is incorporated into the connection terminals and thereby divides the connection terminals into the first connectors on one side of the partition and the second connectors on the other side of the partition.

* * * * *